A. J. COLLAR.
FISH SCREEN FOR DITCHES.
APPLICATION FILED SEPT. 30, 1907.

991,700.

Patented May 9, 1911.

WITNESSES
Leon Boillot

INVENTOR
Adoniram J. Collar
by Geo. H. Strong.
Att'y

UNITED STATES PATENT OFFICE.

ADONIRAM J. COLLAR, OF YREKA, CALIFORNIA.

FISH-SCREEN FOR DITCHES.

991,700.   Specification of Letters Patent.   Patented May 9, 1911.

Application filed September 30, 1907. Serial No. 395,158.

*To all whom it may concern:*

Be it known that I, ADONIRAM J. COLLAR, citizen of the United States, residing at Yreka, in the county of Siskiyou and State of California, have invented new and useful Improvements in Fish-Screens for Ditches, of which the following is a specification.

My invention relates to an apparatus by which small fish are prevented from being carried from the streams in which they live into irrigating and other ditches which are designed to take water from such streams for other uses.

It consists in the combination of parts and in details of construction which will be more fully explained by reference to the accompanying drawings in which—

Figure 1:
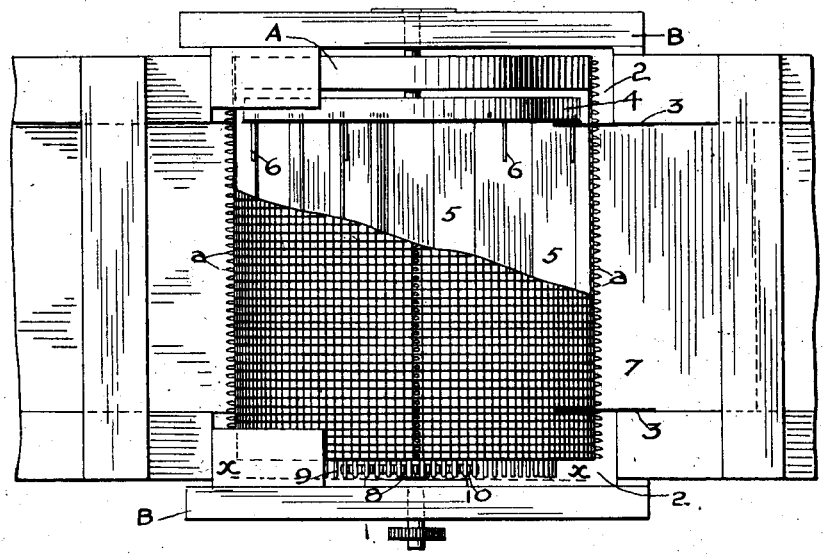
Figure 2:
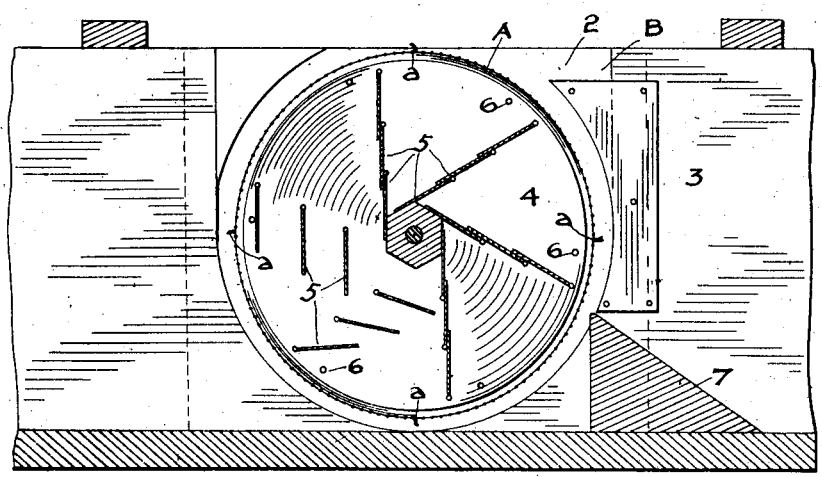
Figure 3:
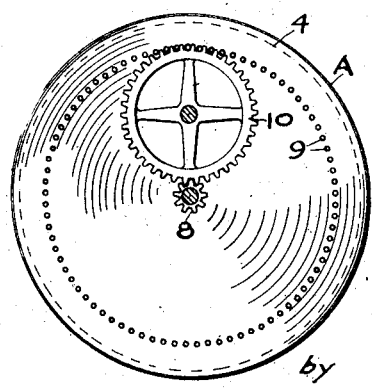
Figure 4:
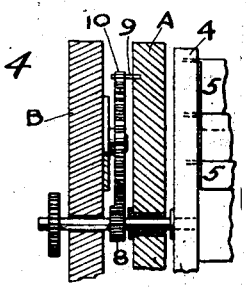

Figure 1 is a plan view partly broken of a fish screen. Fig. 2 is a longitudinal section of the same. Fig. 3 is a vertical section on line X—X Fig. 1 showing the gear connections. Fig. 4 is a vertical sectional view.

Where water is taken from natural streams through artificial ditches for irrigating, power or other purposes, it often occurs that small fish living in such streams are carried into the ditches, and if some means is not employed to prevent their passing on through the ditch, they will be eventually thrown out upon the land during the process of irrigation, and destroyed.

It is the object of my invention to prevent the destruction and loss of fish in this manner.

As shown in the drawings, A is a cylinder which may be made with closed ends and with a screen surface; this screen having a mesh such as is required by law, which is nine meshes to the square inch. This wheel is made of any suitable or desired diameter, depending somewhat upon the size of the ditch within which it is to be used. For convenience the wheel may be journaled in a structure as at B, in which the ends of the wheel extends into chambers 2 which are built out upon each side of the actual width of the sluice through which the water flows, and guards 3 are so placed on the inlet side as to prevent anything flowing through the stream from entering these chambers.

Within the screen wheel A and concentrically therewith, is journaled a paddle-wheel 4, the shaft of which extends loosely through the ends of the screen-wheel, which screen-wheel may be journaled directly upon the shaft of the paddle-wheel, or it may have tubular journals through which the journals of the inner wheel pass; the construction being such as to allow the inner wheel to turn independently of the outer one.

The inner paddle-wheel has vanes or paddles 5 extending across from side to side and having pivots upon their outer edges so that the paddles will swing down by gravitation to stand across the flowing current, and thus turn the wheel, with the bottom moving in the direction of the current flow. I have here shown these vanes or floats made in sections, each outer section overlapping an inner one, and when in position to receive the water pressure, they will form practically a single float extending across the wheel. After the wheel has passed the lower center and begins to rise upon the opposite side, these floats will swing by gravitation into a substantially vertical position, which they will maintain while rising and passing over the upper arc of their travel.

Suitable stops 6 may be so disposed as to hold the vanes or floats in their proper position to resist the pressure of the water when being acted upon, and to stop them at the proper point when passing over the top of the wheel.

A suitable dam or guard 7 is fixed in the sluice-way and extends transversely across the same, close to the wheel, over the top of which the water flows into and through the wheel. The wheel revolving in one direction is designed to operate the screen-wheel to revolve in the opposite direction, or against the flow of the current, the object being to check all rubbish flowing through the sluice or ditch, and to carry it over the top of the wheel, and deposit it in the sluice below the wheel.

If a stationary screen is fixed in the sluice, it soon becomes clogged with fine moss and other rubbish which will be carried by the ditch, and the screen will eventually form a dam which will prevent water from flowing freely in the ditch. By the use of a revoluble screen I am enabled to constantly clear the ditch of such flowing rubbish, and to maintain the screen in a sufficiently open condition to allow the water to flow freely; while at the same time it will prevent any fish from passing through. Contact of the fish with the moving screen will cause them to make an effort to get out of the way by running up the stream, and they will not be carried over the screen-wheel with the floating rubbish.

In order to transmit power to rotate the screen so that its lower part moves in a direction against the flow of the current, any suitable motor driven by the current, or otherwise, may be employed. In the present case I have shown such connections between the paddle-wheel and the screen drum as will transmit the proper motion to the screen. Such a transmitting device consists of a pinion 8 fixed upon the end of the paddle-wheel shaft, and an internal gear 9 carried by the screen drum.

Between the pinion and the internal gear is journaled a gear-wheel 10 which meshes with the pinion 8 upon one side, and with the gear 9 upon the other so that the movement of the paddle-wheel in one direction, caused by the flow of the stream, will impart a contrary revolution to the screen-drum as above described.

In order to insure the debris being lifted and carried over the wheel, the transverse dam 7 insures the material carried in the water, being lifted to a point near enough to the center of the wheel, to insure its being lifted and carried over the wheel, and to further assist in this action, small spurs or projections a may be carried upon the periphery of the screen-wheel which will produce sufficient frictional engagement with the floating material to insure its being lifted.

Having thus described n. invention, what I claim and desire to secure by Letters Patent is—

1. The combination with a sluice-way having extended chambers in the sides, of a foraminous drum extending horizontally across the sluice way and journaled in said chambers, a water-wheel within the drum having its axis concentric with that of said drum, and connections between the water wheel and drum by which the latter is continuously revolved with its submerged portion moving against the current flow.

2. In a fish-screening apparatus, the combination with a sluice-way having extended chambers in the sides, and a guard fixed in the sluice-way and extending transversely across the same, of a screen drum journaled transversely of the sluice-way substantially close to the guard, said guard adapted to deliver material carried by the stream against the screen, mechanism by which the screen is revolved in a direction against the current flow, whereby the material is constantly carried over the drum and the openings thereof prevented from being clogged, said mechanism consisting of a water wheel journaled within the drum and connections between said wheel and the drum, said drum having its ends extending into the side chambers of the sluice-way.

In testimony whereof I have hereunto set my hand in presence of two subscribing witnesses.

ADONIRAM J. COLLAR.

Witnesses:
CHAS. B. HOWARD,
FRANK W. HOOPER.